US008714054B1

(12) United States Patent
Hiles et al.

(10) Patent No.: US 8,714,054 B1
(45) Date of Patent: May 6, 2014

(54) TRACTOR-TRAILER TIRE CHAIN INSTALLATION TOOL

(71) Applicants: Daniel Hiles, Apple Valley, CA (US);
Nancy Hiles, Apple Valley, CA (US)

(72) Inventors: Daniel Hiles, Apple Valley, CA (US);
Nancy Hiles, Apple Valley, CA (US)

( * ) Notice: Subject to any disclaimer, the term of this patent is extended or adjusted under 35 U.S.C. 154(b) by 0 days.

(21) Appl. No.: 13/721,563

(22) Filed: Dec. 20, 2012

(51) Int. Cl.
*B60C 27/06* (2006.01)

(52) U.S. Cl.
USPC .............................. 81/15.8; 152/220; 280/477

(58) Field of Classification Search
USPC ............ 81/15.8, 351, 370, 378, 177.1, 177.6;
152/213 R, 218, 217, 124, 208
See application file for complete search history.

(56) References Cited

U.S. PATENT DOCUMENTS

| | | | | | |
|---|---|---|---|---|---|
| 824,041 | A | * | 6/1906 | Pilliner | 157/1.17 |
| 1,344,472 | A | * | 6/1920 | Allen | 81/15.8 |
| 1,372,195 | A | * | 3/1921 | Rounds | 152/213 R |
| 1,416,300 | A | * | 5/1922 | Loder | 152/218 |
| 1,488,887 | A | * | 4/1924 | Lee | 152/242 |
| 1,674,691 | A | * | 6/1928 | Marsh | 81/15.8 |
| 2,217,498 | A | * | 10/1940 | Shepherd et al. | 152/241 |
| 2,311,621 | A | * | 2/1943 | Royer | 152/213 A |
| 2,316,718 | A | * | 4/1943 | Royer | 152/213 A |
| 2,753,913 | A | * | 7/1956 | Unger et al. | 152/213 R |
| 2,780,278 | A | * | 2/1957 | Olsen | 157/1 |
| 2,832,628 | A | * | 4/1958 | Turnbull | 294/17 |
| 3,088,511 | A | * | 5/1963 | Myers | 152/217 |
| 3,408,884 | A | * | 11/1968 | Musgrove | 81/15.8 |
| 3,547,177 | A | * | 12/1970 | Valley | 152/220 |
| 3,580,317 | A | * | 5/1971 | McHargue | 152/208 |
| 3,591,142 | A | * | 7/1971 | Hatcher | 254/258 |
| 3,750,734 | A | * | 8/1973 | McCord | 152/220 |
| 3,857,428 | A | * | 12/1974 | Dolphin | 152/241 |
| 3,945,087 | A | * | 3/1976 | Miller | 254/131 |
| 4,391,315 | A | * | 7/1983 | Jacobson | 152/213 A |
| 4,512,554 | A | * | 4/1985 | Racine | 254/131 |
| 5,020,396 | A | * | 6/1991 | Dunn | 81/15.8 |
| 5,079,976 | A | * | 1/1992 | Priest | 81/15.8 |
| 5,165,661 | A | * | 11/1992 | Wright | 254/131 |
| 5,255,577 | A | * | 10/1993 | Keefauver | 81/15.8 |
| 6,047,754 | A | * | 4/2000 | Drum | 152/213 R |
| 6,964,407 | B1 | * | 11/2005 | Butler | 254/131 |
| 7,007,572 | B2 | | 3/2006 | Woodworth et al. | |
| 7,293,759 | B2 | * | 11/2007 | Beach et al. | 254/131 |
| 7,318,363 | B1 | * | 1/2008 | Barber | 81/15.8 |
| 7,717,452 | B2 | * | 5/2010 | Cook | 280/477 |
| 2008/0106064 | A1 | * | 5/2008 | Cook | 280/477 |

* cited by examiner

*Primary Examiner* — Lee D Wilson
*Assistant Examiner* — Melanie Alexander
(74) *Attorney, Agent, or Firm* — Crossley Patent Law; Micah C. Gunn

(57) ABSTRACT

A tractor-trailer tire chain installation tool that includes a rod having a handle portion, a midsection, and a flattened head section configured for wielding within the wheel well of a tractor-trailer, wherein a plurality of chain hooks disposed depending from the rod are spaced apart at a correct distance along the rod to span the width of each tire of a double tire of the tractor-trailer, whereby a tire chain is releasably attachable to each of said chain hooks and positional to correctly align the tire chain for expedient installation around the double tire during inclement weather.

3 Claims, 4 Drawing Sheets

TRACTOR-TRAILER TIRE CHAIN INSTALLATION TOOL

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

Be it known that we, Daniel Hiles and Nancy Hiles, citizens of the United States, have invented new and useful improvements in a tractor-trailer tire chain installation tool as described in this specification.

BACKGROUND OF THE INVENTION

Various types of tractor-trailer tire chain installation tools are known in the prior art. However, what is needed is a tractor-trailer tire chain installation tool that includes a rod having a handle portion, a midsection, and a flattened head section configured for wielding within the wheel well of a tractor-trailer, wherein a plurality of chain hooks disposed depending from the rod are spaced apart at a correct distance along the rod to span the width of each tire of a double tire of the tractor-trailer, whereby a tire chain is releasably attachable to each of said chain hooks and positional to correctly align the tire chain for expedient installation around the double tire during inclement weather.

FIELD OF THE INVENTION

The present invention relates to a tractor-trailer tire chain installation tool, and more particularly, to a tractor-trailer tire chain installation tool that includes a rod having a handle portion, a midsection, and a flattened head section configured for wielding within the wheel well of a tractor-trailer, wherein a plurality of chain hooks disposed depending from the rod are spaced apart at a correct distance along the rod to span the width of each tire of a double tire of the tractor-trailer, whereby a tire chain is releasably attachable to each of said chain hooks and positional to correctly align the tire chain for expedient installation around the double tire during inclement weather.

SUMMARY OF THE INVENTION

The general purpose of the tractor-trailer tire chain installation tool, described subsequently in greater detail, is to provide a tractor-trailer tire chain installation tool which has many novel features that result in a tractor-trailer tire chain installation tool which is not anticipated, rendered obvious, suggested, or even implied by prior art, either alone or in combination thereof.

The present invention renders installation of tire chains on tractor-trailer double tires more expedient. During inclement weather, when chains are advisable or required, the rapid deployment of tire chains to the requisite tractor-trailer tires is beneficial. Firstly, the weather itself poses risks to the truck driver installing the tire chains—not only is the temperature cold and the conditions unpleasant, reduced visibility caused by blowing snow and other precipitation creates a hazard form other road users as the driver attempts to install the tire chains on the roadside, often where plowed snow decreases the size of the hard shoulder. Secondly, the time taken to install the tire chains directly impacts the delivery time of driver. Wherefore an expedient method of installing tire chains is warranted.

The present device, then, includes a rod having a proximal end and a distal end. The proximal end includes a handle portion with a grip section disposed thereupon configured to be conformable to the hand of a user wielding the device. A midsection is contiguous with the handle portion and a flattened head section is disposed at a distal end of the rod. The head section is flattened to enable wielding of the device within the wheel well circumferentially with respect to a tractor-trailer wheel about which the device is used when installing a tire chain. The rod may be made of a polymeric and alternately metallic substance enabling the necessary rigidity to wield around a tractor-trailer wheel while supporting a chain.

A first chain hook is vertically disposed depending from the midsection proximal the handle portion. A second chain hook is vertically disposed depending from the midsection proximal to the head section, and a third chain hook is vertically disposed depending from the distal end.

Each of said first, second and third chain hooks include a chain portion depending from the rod and a hook portion disposed endwise on the chain portion. The hook portion is releasably attachable to a tire chain. The distance between each of the first, second, and third chain hooks is configured to span the width of each tire of a tractor-trailer double tire. Thus, when a tire chain is attached to the hook portion of each of the first, second, and third chain hooks, the tire chain is positional around each tire of the tractor-trailer double tire by simply extending the rod into the wheel well of the double tire to which the tire chain is desired to be attached. The tire chain depends down from each of the first, second, and third chain hooks, and falls into the correctly aligned position whereby a user may simple detach the tractor-trailer tire chain installation tool by disengaging the hook portion of each of the first, second, and third chain hooks, and then simply fasten the tire chain around the double tire in the typical fashion.

To assist in the correct positioning of the tire chain, a tubular piece is disposed around the chain portion of each of the first and second chain hooks, said tubular piece supporting said chain portion when the device is wielded. The chain portion of each of the first and second chain hooks is thereby maintained in an extended position to prevent slackness in the chain portion from incorrectly aligning the tire chain when the device is wielded.

Thus has been broadly outlined the more important features of the present tractor-trailer tire chain installation tool so that the detailed description thereof that follows may be better understood and in order that the present contribution to the art may be better appreciated.

Objects of the present tractor-trailer tire chain installation tool, along with various novel features that characterize the invention are particularly pointed out in the claims forming a part of this disclosure. For better understanding of the tractor-trailer tire chain installation tool, its operating advantages and specific objects attained by its uses, refer to the accompanying drawings and description.

BRIEF DESCRIPTION OF THE DRAWINGS FIGURES

DETAILED DESCRIPTION OF THE DRAWINGS

Figure 1:
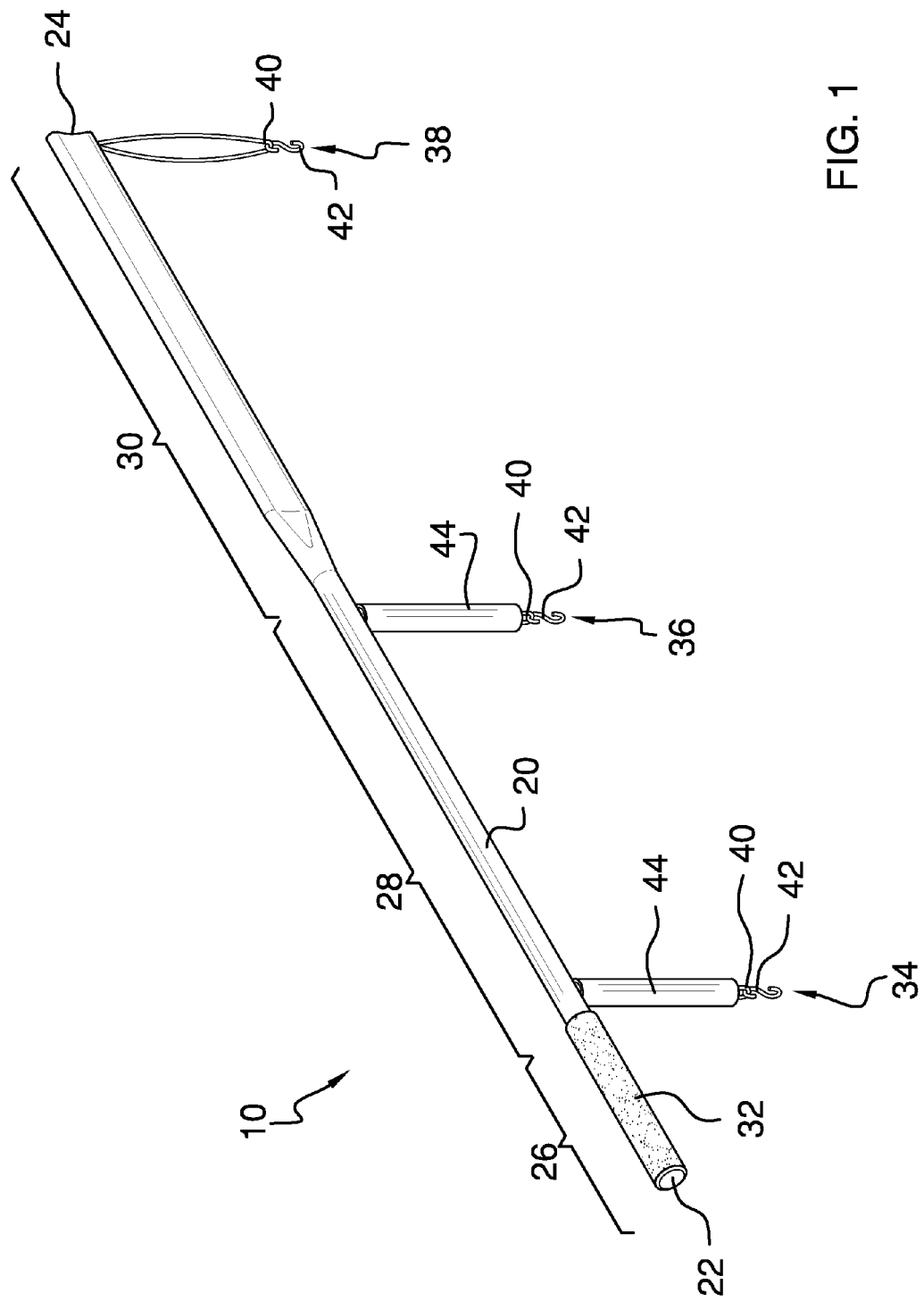
FIG. 1 is an isometric view.
Figure 2:
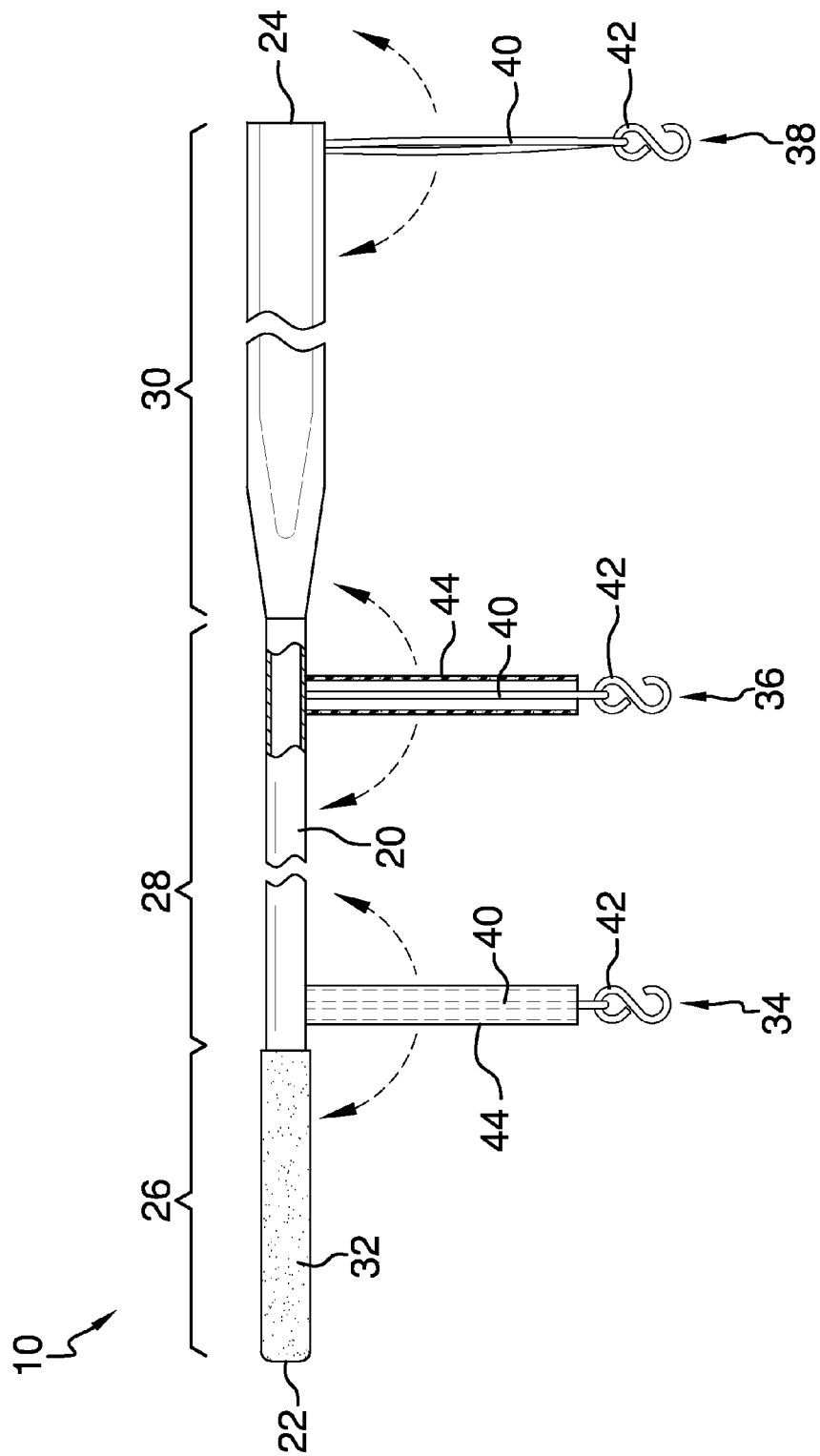
FIG. 2 is a side view illustrating each chain portion with each tubular piece.
Figure 3:
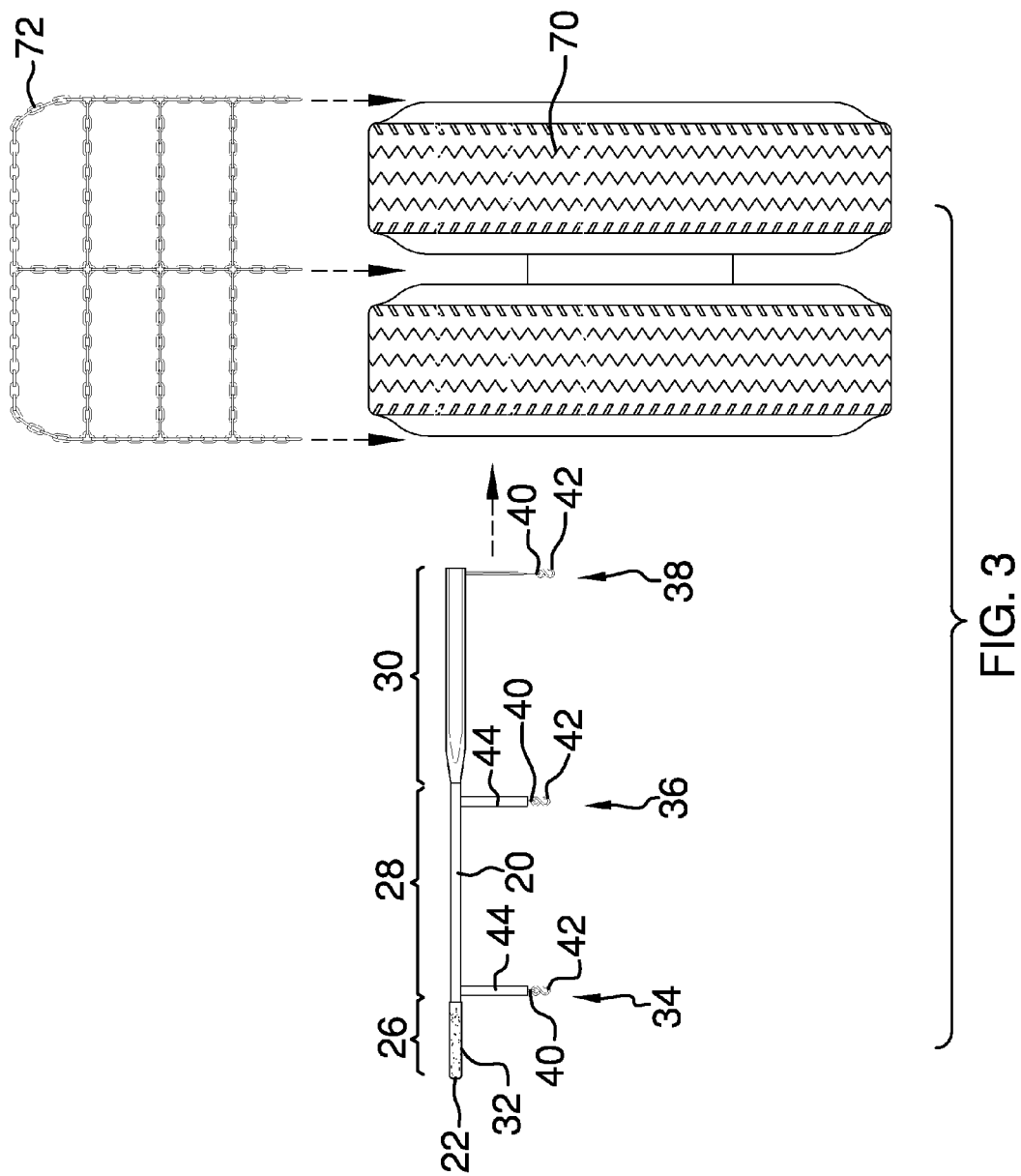
FIG. 3 is an exploded in-use view showing the installation of a tire chain to a tractor-trailer double tire.
Figure 4:
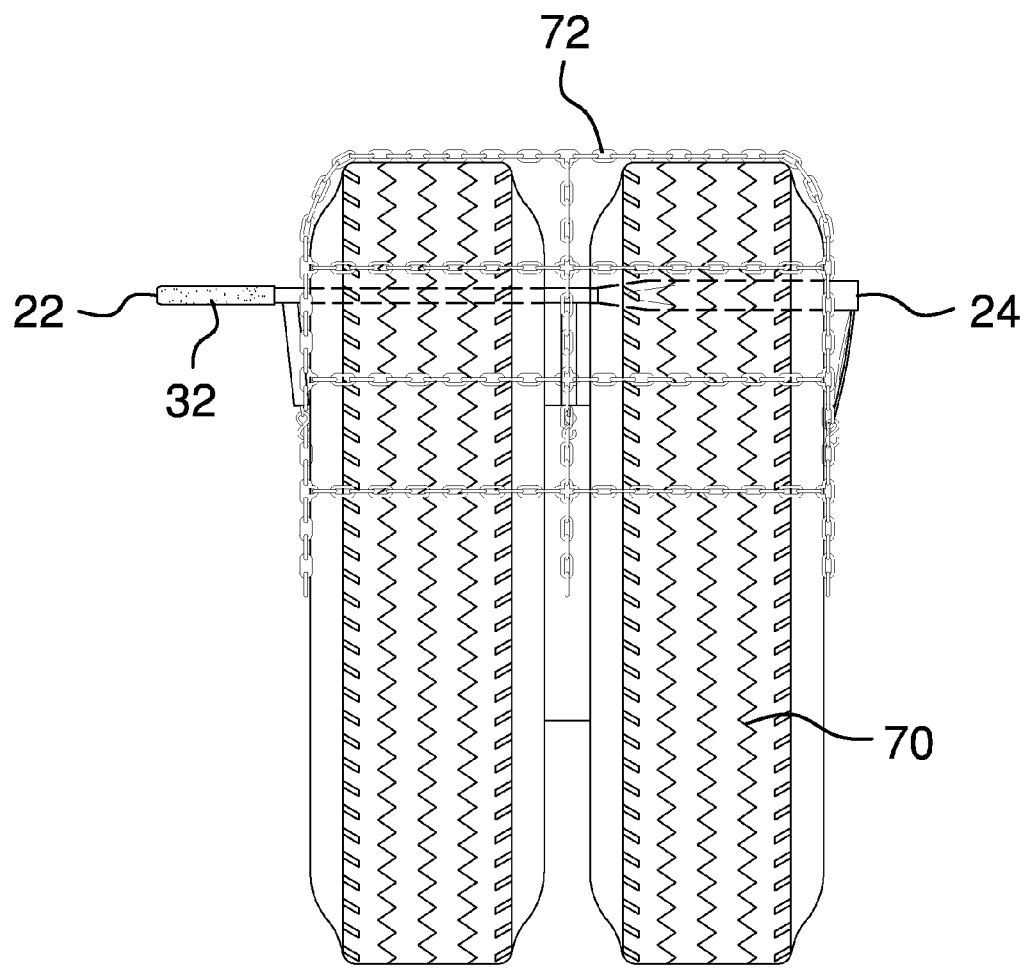
FIG. 4 is an in-use view showing the installation of the tire chain to the tractor-trailer double wheel.

With reference now to the drawings, and in particular FIGS. 1 through 4 thereof, example of the instant tractor-trailer tire chain installation tool employing the principles and concepts of the present tractor-trailer tire chain installation tool and generally designated by the reference number 10 will be described.

Referring to FIGS. 1 through 4 a preferred embodiment of the present tractor-trailer tire chain installation tool 10 is illustrated.

The present invention 10 has been devised to more expediently render the installation of tire chains to tractor-trailer double tires 70. The present device 10, therefore, positions the tire-chain 72 onto the double tire 70 whereby said tire chain 72 is positioned appropriately over each tire of the tractor-trailer double tire 70.

The present device 10 enables a user to simply releasably attach a tire chain 72 to a hook portion 42 disposed endwise on a chain portion 40 of each of a first, second, and third chain hook 34, 36, 38, and thereafter extend a rod 20 into the wheel well over the double tire 72 to which the tire chain 72 is to be installed. Each of said chain hooks 34, 36, 38, is disposed depending from the rod 20 whereby a user is enabled to extend the rod 20 from a hand wielding the device 10 into the wheel well of a tractor-trailer and apply the tire chain 72 to the correct position encompassing each tire of the double tire 70.

The tractor-trailer tire chain installation tool 10 therefore includes a rod 20 having a proximal end 22 and a distal end 24. The rod 20 includes a handle portion 26 disposed upon the proximal end 22, a midsection 28, and a flattened head section 30 disposed upon the distal end 24. A grip section 32 is disposed upon the handle portion 26. The flattened head section 30 is configured to enable positioning and movement of the rod 20 within the wheel well of the tractor-trailer with which the device 10 is used.

Each of the first, second, and third chain hooks 34, 36, 38, includes a chain portion 40 depending from the rod 20 and a hook portion 42 disposed endwise upon each of the chain portions 40. The first chain hook 34 is vertically disposed upon the midsection 28 proximal the handle portion 26. The second chain hook 36 is vertically disposed upon the midsection 28 proximal the flattened head section 30. The third chain hook 38 is vertically disposed upon the flattened head section 30 at the distal end 24. The distance between each of the first, second, and third chain hooks 34, 36, 38 is configured to span the width of each tire of a tractor-trailer double tire 70.

To enable placement of the tire chain 72 when attached to each hook portion 42, a tubular piece 44 is disposed around each of the first and second chain hooks, 34, 36, between the rod 20 and the hook portion 42. The tubular piece 44 assists supporting the each of the first and second chain hooks 34, 36, chain portion 40 when the device 10 is used, to prevent slackness in the chain portion 40 from preventing positioning of the tire chain 72 appropriately around the double tire 70 of the tractor-trailer with which the device 10 is used.

A user thus releasably attaches a tire chain 72 to the hook portion 42 of each of the first, second, and third, chain hooks 34, 36, 38 and then extends the rod 20 into the wheel well. The tire chain 72 is positioned appropriately encompassing each of the double tires 70. The user then detaches the tire chain 72 from the hook portion 42 of each of the first, second, and third chain hooks 34, 36, 38, and fastens the tire chain 72 around the wheel in the typical fashion. The user is saved time aligning the tire chain 72 to the correct position, and spared the need of having to reach an arm into the wheel well to fit the tire chain 72 around the inner tire of the tractor-trailer double tire 70.

What is claimed is:

1. A tractor-trailer tire chain installation tool comprising:
a rod having a proximal end and a distal end, said rod comprising:
a handle portion disposed upon the proximal end;
a midsection;
a flattened head section disposed upon the distal end;
a grip section disposed upon the handle portion;
a first chain hook disposed upon the midsection proximal the handle portion;
a second chain hook disposed upon the midsection proximal the flattened head section;
a third chain hook disposed upon the flattened head section at the distal end;
wherein a tubular piece is disposed on each of first and second chain hooks;
wherein the distance between each of the first, second, and third chain hooks is configured to span the width of each tire of a tractor-trailer double tire, whereby tire chains depending from each of said chain hooks are applied to the tractor-trailer double tire with relative ease.

2. The tractor-trailer tire chain installation tool of claim 1 wherein each of the first, second and third chain hooks comprise:
a chain portion attached to the rod;
a hook portion disposed endwise upon the chain portion, said hook configured to releasably engage with an extant tire chain.

3. A tractor-trailer tire chain installation tool comprising:
a rod having a proximal end and a distal end, said rod comprising:
a handle portion disposed upon the proximal end;
a midsection;
a flattened head section disposed upon the distal end;
a grip section disposed upon the handle portion;
each of a plurality of chain hooks comprising a chain portion depending from the rod and a hook portion disposed endwise upon each of the chain portions, said plurality of chain portions comprising:
a first chain hook disposed upon the midsection proximal the handle portion;
a second chain hook disposed upon the midsection proximal the flattened head section;
a third chain hook disposed upon the flattened head section at the distal end;
a tubular piece disposed around each of the first and second chain hooks, said tubular piece disposed between the rod and the hook portion;
wherein the distance between each of the first, second, and third chain hooks along the rod is configured to span the width of each tire of a tractor-trailer double tire, whereby tire chains depending from each of said chain hooks are applied to the tractor-trailer double tire with relative ease.

* * * * *